United States Patent Office 3,075,727
Patented Jan. 29, 1963

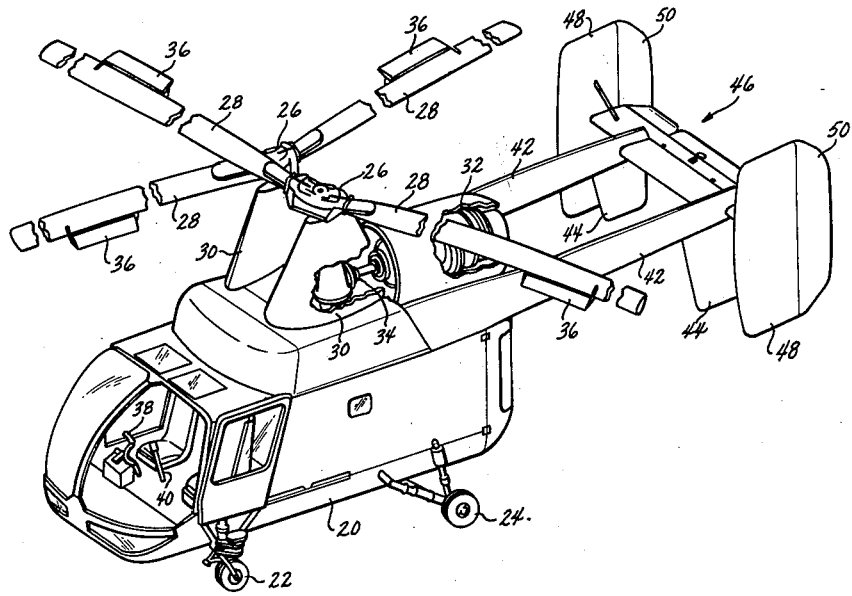

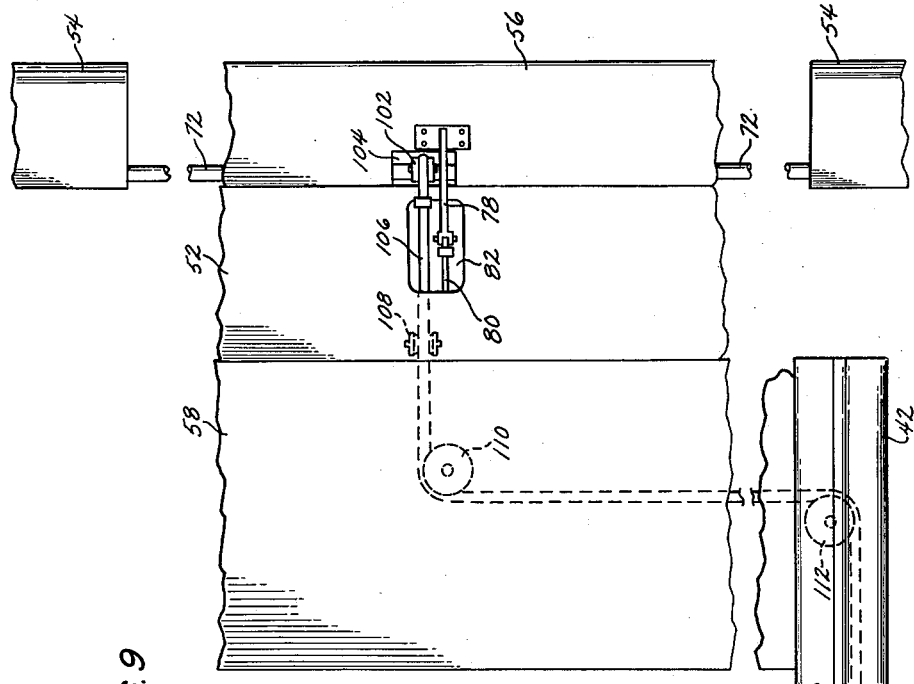
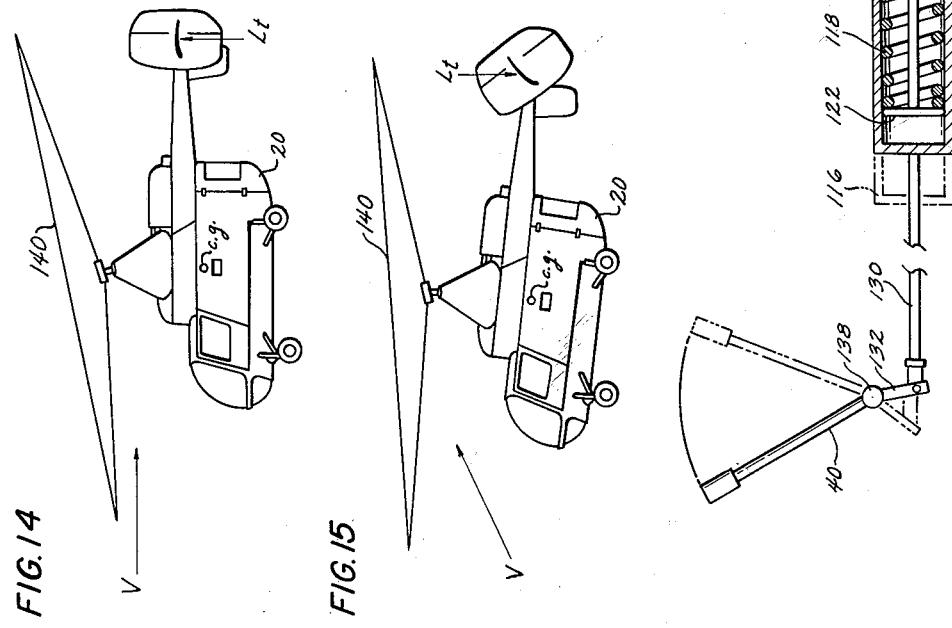

3,075,727
VELOCITY SENSITIVE STABILIZER
Charles W. Ellis, III, Bloomfield, and William E. Blackburn, Windsor Locks, Conn., assignors to Kaman Aircraft Corporation, Bloomfield, Conn., a corporation of Connecticut
Filed Dec. 6, 1960, Ser. No. 74,050
16 Claims. (Cl. 244—17.13)

This invention relates to stabilizers for controlling the longitudinal trim of aircraft, and deals more particularly with a stabilizer having a lift coefficient which varies as a function of airspeed and in such a manner as to maintain a desirable trim load on the tail of the aircraft despite changes in the relative airspeed.

The stabilizer of this invention is particularly useful in connection with helicopters and other rotary wing aircraft and will be described hereinafter as applied to a helicopter. It is contemplated, however, that certain features of the invention may be advantageously applied to other types of aircraft as well, and as to these features the invention is therefore not to be considered as necessarily limited to helicopters.

The general object of this invention is to provide an aircraft stabilizer having a variable angle of attack which changes automatically as a function of airspeed so as to provide a constant or substantially constant lift over a given range of airspeeds during forward flight.

Another object of this invention is to provide a device operable to impart proper longitudinal trim and stability characteristics to a helicopter in both power-on and power-off (auto-rotative) flight. In keeping with this object it is a more specific object of the invention to provide a stabilizer which functions to assure a positive longitudinal static stability with respect to speed during forward flight, and which improves the vibration level of the helicopter by reducing the longitudinal cyclic input required to maintain trim conditions at different forward speeds.

A further object of this invention is to provide in a helicopter a stabilizer which is sensitive to changes in the relative airspeed over a given range of relative airspeeds, so that its lift coefficient changes with changes in the relative airspeed, and in which the range of sensitive airspeeds varies as a function of the collective stick setting so that the stabilizer will in general be sensitive to changes in airspeed at the various airspeeds corresponding to the various different stick settings.

A more specific object of this invention is to provide a velocity sensitive stabilizer including a free floating elevator or like part aerodynamically positioned to different angles of attack by a spring biased tab or other similar means and including means for producing a moment change counteracting the elevator movement caused by deflection of the spring biased tab so as to stabilize the elevator movement and produce a more desirable characteristic of elevator angle of attack with respect to speed.

Other objects and advantages of the invention will be apparent from the description which follows and from the drawings forming a part hereof.

The drawings show the preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a perspective view of a helicopter embodying the invention.

FIG. 2 is a perspective view showing the tail section or empennage of the helicopter shown in FIG. 1.

FIG. 9 is a fragmentary and somewhat schematic view showing the mechanism for biasing the spring biased tabs, the elevator, stabilizer and tabs being shown in plan.

Figure 3:
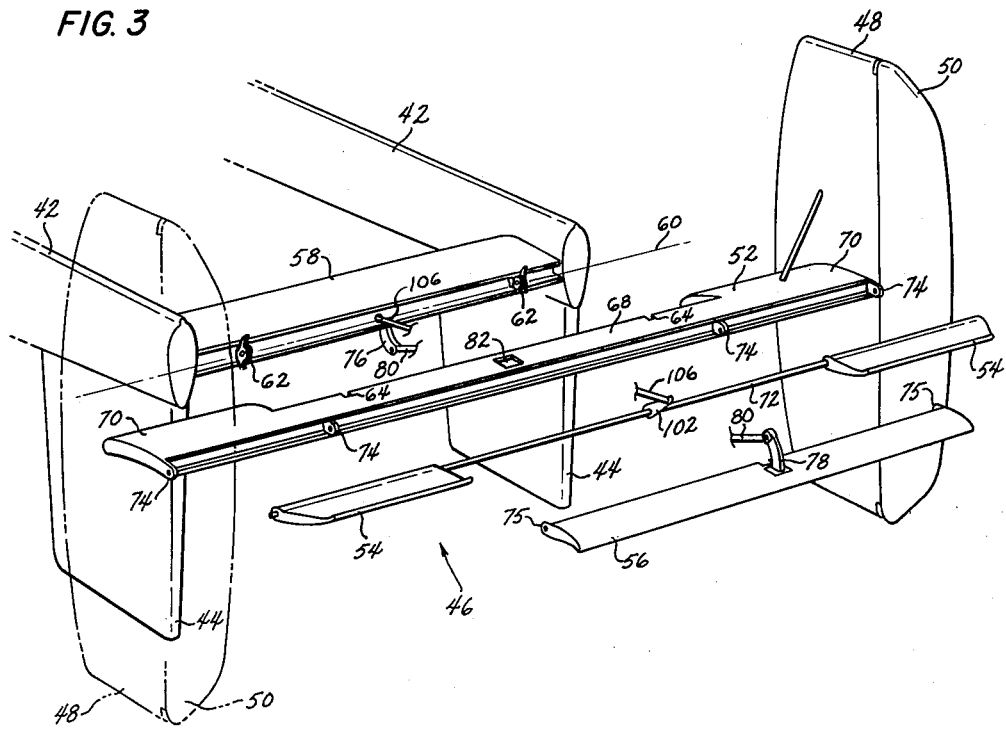
FIG. 3 is an exploded perspective view of the tail section shown in FIG. 2.

FIGS. 10 to 13, inclusive, are schematic representations showing the relative positions assumed by the stabilizer, elevator and tabs for different flight conditions and different settings of the collective stick.

FIG. 14 is a diagrammatic illustration of a helicopter in steady forward flight.

FIG. 15 is similar to FIG. 14 but shows the helicopter during power-off or autorotative flight.

General Organization

FIG. 1 of the drawings shows a helicopter embodying the invention, the view being taken generally from the front and left of the helicopter. The illustrated helicopter is of the type generally referred to as a syncropter, having two rotors which are closely spaced transversely of the helicopter so as to have their blades positioned in intermeshing relationship.

The helicopter, as illustrated, comprises a fuselage 20 provided with landing wheels 22 and 24 on the left side of the fuselage, as shown, there being two similar wheels on the right-hand side of the fuselage. Supported for rotation relative to the fuselage 20 are two rotors comprising respectively two hub structures 26, 26 and two blades 28, 28 attached to each of the hub structures. The rotors are located at the top of two pylons 30, 30 spaced transversely of the fuselage. Carried within the fuselage 20 is a suitable power plant 32 which, through a suitable drive mechanism indicated at 34, drives the two rotors in unison but in opposite directions. The rotation of the rotor blades 28, 28 by the power plant 32 serves to provide the lift or thrust required to sustain the helicopter in flight and to propel the same forwardly. Changes in the rotor thrust are obtained by collectively changing the pitches of the blades 28, 28. The blade pitches are also changeable in a cyclical manner to impart control moments to the helicopter for maneuvering the same. As shown, the pitches of the blades are varied by means of a servo tab 36 associated with each blade, the servo tab being adjustable angularly with respect to the associated blade to create an aero-dynamic reaction force which twists the blade in one direction or other to achieve the desired blade pitch.

The pitches of the rotor blades 28, 28 are varied by manipulation of pilot operable control devices located in the fuselage 20 to change the speed or lift of the helicopter or to change its direction of flight. These pilot operable devices consist of control sticks 38 and 40. The control stick 38 is movable in various predetermined directions corresponding to desired changes in the direction of helicopter flight and is effective to change the pitches of the rotor blades in a cyclical manner. In addition to the control stick 38, the helicopter also includes foot pedals, not shown, which are operable to additionally change the rotor blade pitches to obtain further directional control of the helicopter. Movement of the stick 38 in a generally fore and aft direction is operable to vary the pitches of the rotor blades in a longitudinal cyclic manner to control the longitudinal pitching movement of the helicopter. Moving the stick forwardly has the effect of tilting the rotor thrust vectors forwardly and imparting a nose-down pitching moment on the helicopter, while moving the stick rearwardly has the opposite effect of tilting the rotor thrust vectors rearwardly and imparting a nose-up pitching moment to the helicopter. Moving the stick 38 laterally causes the blade pitches to be varied in a lateral cyclic manner and has the effect of tilting the rotor thrust vectors toward the side to which the stick is moved. The tilting of the thrust vectors to one side or the other of the helicopter imposes some roll moment on the helicopter, causing it to change its attitude in roll, and produces a lateral component of thrust which moves the helicopter sideways. The lateral thrust component is generally considered the more important of the effects produced by the lateral stick movement and is used to control the sideslip movement of the helicopter. The foot pedals are used to control the yawing movements of the helicopter. Movement of the pedals changes the pitches of the rotor blades in both a differential collective manner and a differential longitudinal cyclic manner. The differential collective pitch change imparts some roll moment to the helicopter and also some yaw moment due to the difference in torque applied to the two oppositely rotating rotors. Additional yaw moment is applied by the differential longitudinal cyclic pitch change. The pitch changing mechanism associated with the control stick 38 and the foot pedals forms no part of the present invention and may be of various suitable constructions. For the present purposes it is sufficient to note that the net effect of the operation of the control stick 38 and/or the foot pedals is to tilt or incline the rotor thrust vectors in various directions relative to the helicopter fuselage or to relatively increase or decrease their magnitude to produce forces and moments on the helicopter for moving the same in the desired directions.

The control stick 40 is operable by the pilot to change the collective pitches of the rotor blades 28, 28 for the purpose of varying the combined thrust or lifting force of the rotors. That is, movement of the control stick 40 in one direction or another changes the pitches of all four rotor blades 28, 28 to the same extents and in the same direction so as to uniformly vary the magnitude of the thrust vector associated with each rotor without changing its inclination relative to the fuselage. The control stick 40 is pivotally movable relative to the fuselage between a forward or lowered position and a raised or rearward position. In the fully forward position of the stick the rotor blades 28, 28 are positioned to have a relatively small collective pitch as required for autorotative descent in the power-off flight regime of the helicopter. In the power-on regime of flight the stick 40 is normally displaced rearwardly from its fully forward or lowered position. This provides the rotor blades 28, 28 with a greater collective pitch to provide the thrust required for hovering, climbing or steady forward flight. As a general rule, an increase in the rate of climb of the helicopter or in its forward speed is accompanied by a rearward movement of the collective stick 40 to produce an increase in the collective pitches of the rotor blades, while a decrease in the rate of climb or a decrease in the forward speed is accompanied by a forward movement of the stick 40 to decrease the collective pitches of the rotor blades. The means for effecting collective pitch adjustment of the blades 28, 28 in response to movement of the control stick 40 may be of various suitable constructions and by itself forms no part of the present invention.

The helicopter shown in FIG. 1 also includes an empennage or tail assembly comprising two transversely spaced tail booms 42, 42 which are fixed to the fuselage 20 and extend rearwardly therefrom. At their rearward ends each of the tail booms 42, 42 is provided with a depending vertical stabilizer 44 which serves to impart a certain amount of lateral stability to the helicopter during forward flight. The stabilizers 44, 44, however, form no part of this invention and may be eliminated or constructed and arranged otherwise than as shown without departing from the invention. Also located at the rear ends of the tail booms 42, 42 is a horizontal stabilizer, indicated generally by the reference numeral 46, constructed in accordance with the present invention. The various details of the stabilizer 46 will be described hereinbelow. For the present it should be noted that the stabilizer 46 has associated therewith two additional vertical stabilizers 48, 48 which are located respectively at its opposite transverse ends. The two vertical stabilizers 48, 48 are employed to provide additional lateral stability and preferably each has associated therewith a rudder 50 which is movable about a vertical axis to various deflected positions relative to the associated stabilizer 48. The two rudders 50, 50 are moved in unison and in the same direction by operation of the foot pedals or other directional control device to aid the rotors in turning the helicopter about a vertical yaw axis during forward flight. The effectiveness of the rudders 50, 50 in producing yawing movements of the helicopter of course depends on the relative speed of the air passing thereover, and for relatively high speed forward flight the rudders 50, 50 may be relied upon to provide the greater part of the total yaw moment required to change the direction of movement of the helicopter about the yaw axis, thereby reducing the amount of rotor blade pitch control required.

It is to be understood, however, that the vertical stabilizers 48, 48 and the associated rudders 50, 50 are not essential to the present invention. Although the horizontal stabilizer 46 is shown in FIG. 1 to have the vertical stabilizers 48, 48 and rudders 50, 50 associated therewith, these latter parts could be eliminated or otherwise constructed and arranged without departing from the invention.

*General Assembly of Velocity Sensitive Stabilizer*

Basically, a velocity sensitive stabilizer made in accordance with this invention consists of a free floating elevator which is positioned about a transverse axis to different angles of attack by a first reaction surface which deflects as a function of airspeed and by a second reaction surface which deflects in response to the movement of the elevator relative to the fuselage or other fixed parts of the helicopter. As applied herein to the elevator, the term "free floating" means that the elevator is not otherwise connected to the fuselage or other fixed parts of the helicopter than by a hinge connection supporting it for pivotal movement about a transverse axis, and includes no linkages or other mechanism for mechanically positioning it about the transverse axis. The elevator is therefore free to move or float about the transverse axis to different angular positions relative to the fuselage in response to the aerodynamic moments exerted thereon.

The first reaction surface is biased towards a maximum deflected position in opposition to the aerodynamic pressure exerted thereon and is moved to a less deflected position when the aerodynamic moment exceeds the biasing moment. Deflection of this surface in turn changes the moment about the elevator hinge axis, causing the elevator to be moved toward a new angle of attack. As the elevator is so moved, however, the second reaction surface is moved in such a direction as to create a change in moment acting in opposition to the elevator movement. The second reaction surface thus stabilizes the elevator movement brought about by the deflection of the first reaction surface so that for a given deflection of the first surface the accompanying movement of the elevator is much less than would be obtained by the first surface acting alone in the absence of the second surface, thereby achieving a quite precise positioning of the elevator. The second surface in fact, it will be noted, acts somewhat similarly to a feedback mechanism so as to reduce the error involved in positioning the elevator to its desired position. That is, the second reaction surface tends to compensate for deviations in the deflection of the first surface from the expected deflection so that in the event of such deviation the elevator is moved more closely to the position desired for the instantaneous relative airspeed than it would be in the absence of the second surface. As applied to a helicopter, and as shown in the present drawings, the first reaction surface is so arranged relative to the elevator that movement of the surface from a more to a less deflected position relative to the elevator results in movement of the elevator to a smaller angle of attack to decrease its coefficient of lift. Therefore, the increase in lift normally accompanying an increase in airspeed is reduced or eliminated by a decrease in the lift coefficient of the elevator.

It is also preferable, but not essential to the broader aspects of the invention, that the stabilizer include means for varying the bias force or moment exerted on the first reaction surface. As will be brought out in more detail hereinbelow, the stabilizer is sensitive to changes in the relative airspeed over a given range of relative airspeeds, and the magnitude of the bias force or moment controls the location of the sensitive range with respect to the full airspeed spectrum. Decreasing the bias in general has the effect of lowering the airspeeds at which the elevator is sensitive. Increasing the bias has the opposite effect of raising the airspeeds at which the elevator is sensitive. Preferably, although not necessarily, the biasing means is connected with and operable by the collective rotor blade pitch changing means so that the bias force varies with the collective stick setting and in such a manner that the elevator sensitivity range is adjusted to provide the optimum elevator performance for the trim speeds corresponding to the various stick settings.

FIGS. 2 and 3 show the general construction and arrangements of the parts comprising the stabilizer 46 of the helicopter of FIG. 1. FIG. 2 shows the elevator in its assembled condition, while FIG. 3 shows the various parts thereof in an exploded view to provide a better understanding of how the parts are connected for relative movement. Referring to these figures, the stabilizer includes an elevator 52, two spring biased tabs 54, 54, which together provide the first reaction surface mentioned above, and a stabilizing tab 56 providing the second reaction surface mentioned above. Extending between the two tail booms 42, 42 is a fixed stabilizer 58 which is preferably disposed at a small positive angle of attack, on the order of 6°, to the tail booms so as to produce an upwardly directed lift force during steady forward flight of the helicopter. The fixed stabilizer 58, however, has little effect on the flight characteristics of the helicopter and may be eliminated without departing from at least the broader aspects of the present invention. In the illustrated assembly, however, the fixed stabilizer 58 is useful as a structural brace between the two tail booms 42, 42 and as a support for the elevator 52.

The elevator 52 is pivotally connected with the fixed stabilizer for free floating movement about a transverse hinge line or axis, indicated at 60 in FIG. 3, by two apertured ears 62, 62 extending rearwardly from the trailing edge portion of the stabilizer 58. The ears 62, 62 are received in corresponding slots 64, 64 and each is pivotally connected with the elevator 52, as shown best in FIG. 6, by suitable means such as a bolt 66 which passes loosely through the opening of the ear 62 and corresponding openings in the structure of the elevator. As shown, the elevator 52 preferably comprises a middle portion 68, which extends rearwardly from the hinge axis 60 and is generally coextensive with the fixed elevator 58, and two opposite end portions 70, 70 which are located outboard of the respective tail booms, 42, 42 and which extend both rearwardly and forwardly from the elevator hinge axis 60. The elevator 52 is aerdynamically positioned about the hinge line 60 to different angles of attack by the combined action of the spring tabs 54, 54 and the stabilizing tab 56 and will assume a position representing a balance of moments about the hinge line.

Preferably, and as shown, the trailing edge of the elevator 52 is divided spanwise into three sections by the spring tabs 54, 54 and the stabilizing tab 56, the stabilizing tab 56 being generally coextensive with the middle elevator portion 68 and the two spring tabs 54, 54 being generally coextensive with respective ones of the outboard elevator portions 70, 70. While this arrangement is preferred, it is, however, not necessarily critical to the broader aspects of the invention and other arrangements of the tabs could be resorted to. The number of spring or stabilizing tabs is also not of great importance. There could, for example, be a relatively large number of transversely spaced spring tabs alternating with an associated number of stabilizing tabs, the spring tabs being interconnected for operation in unison so as to in effect provide a single reaction surface and the stabilizing tabs being likewise interconnected for operation in unison so as to in effect provide another reaction surface.

In the illustrated stabilizer 46 the two spring tabs 54, 54 are maintained in fixed relation to each other and adapted for operation in unison by being fixed to the opposite end portions of a transverse shaft 72. The shaft 72 is in turn loosely received by apertured ears 74, 74 which support the shaft and the spring tabs for pivotal movement relative to the elevator 52. As shown best in FIG. 2, the spring tabs 54, 54 are normally deflected upwardly with respect to the elevator so as to impart a nose-up pitching moment to the elevator during normal forward flight. The trailing edge of each of the spring tabs 54, 54 is also preferably deflected upwardly with respect to the tab body, as shown best in FIG. 8, to impart a larger and more desirable hinge moment coefficient to the tab. That is, the upturned trailing edge increases the aerodynamic hinge moment produced by a given relative airspeed. The stabilizing tab 56 is in turn loosely mounted on the shaft 72 by means of apertured ears 75, 75 so as to be pivotally movable about the axis of the shaft independently of the shaft and the spring tabs 54, 54, and is normally deflected downwardly with respect to the elevator so as to impart a nose-down pitching moment to the elevator during normal forward flight which moment acts in opposition to the moment imparted by the spring tabs. The trailing edge portion of the stabilizing tab 56, as shown best in FIGS. 4 and 5, is also preferably deflected downwardly with respect to the tab body to provide the tab with a larger and more desirable hinge moment coefficient.

As will be brought out hereinafter, movement of the spring tabs 54, 54 to a less deflected position by the aerodynamic pressure acting thereagainst causes pivotal movement of the elevator 52 about its axis 60 which in turn causes movement of the stabilizing tab 56 to a less deflected position. This situation will prevail in all stabilizers in which the spring biased tabs or first reaction surface is deflected relative to the elevator in a direction opposite to the deflection of the stabilizing tab or second reaction surface. It is possible, however, that in some cases both the first reaction surface and the second reaction surface might be deflected in the same direction relative to the elevator. That is, both of the surfaces might be normally deflected upwardly or be both deflected downwardly. In this situation the movement of the second or stabilizing reaction surface should be such that its deflection is increased as the deflection of the first or biased reaction surface is decreased by the action of aerodynamic pressure. The important consideration is that the stabilizing surface is moved in such a direction as to produce a change in moment about the elevator hinge line which counteracts or opposes the movement of the elevator resulting from the changed deflection of the biased surface.

Stabilizing Tab and Associated Structure

Figure 4:
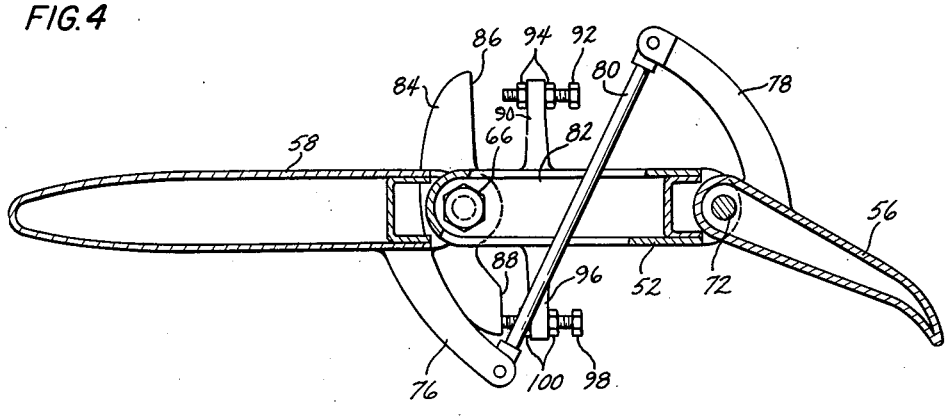
FIG. 4 is a sectional view of the stabilizer and elevator shown in FIG. 2, the view being taken on a vertical plane passing longitudinally through the helicopter and showing the mechanism for moving the stabilizing tab of the elevator in response to movement of the elevator relative to the fixed stabilizer.
Figure 5:
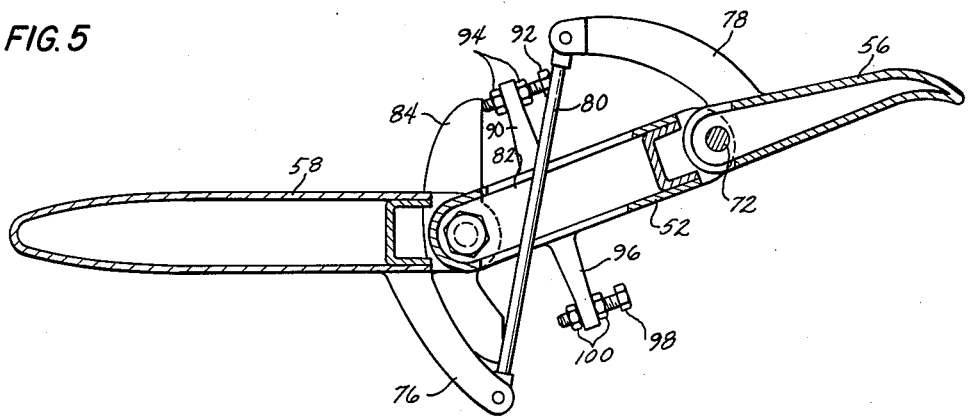
FIG. 5 is a sectional view similar to FIG. 4 but showing the elevator moved to a different position with respect to the fixed stabilizer.

Reference is now made to FIGS. 4 and 5 for a detailed description of the stabilizing tab 56 and the structure associated therewith for moving the same relative to the elevator 52. The tab 56 is supported for pivotal movement about a transverse axis, and is located aft of the elevator hinge axis 60, by the ears 75, 75 which loosely receive the shaft 72, as mentioned above. Also as mentioned above, the means for moving the tab 56 is such that the tab is moved relative to the elevator as the elevator is moved about the hinge axis 60 relative to the fuselage or other fixed structure of the helicopter.

Although the means for moving the tab may take various forms, that shown includes a horn 76 secured to the lower surface of the fixed stabilizer 58 near the trailing edge thereof and a horn 78 secured to the upper surface of the stabilizing tab 56 near the leading edge thereof. The horn 76 extends generally rearwardly and downwardly with respect to the fixed stabilizer 58, while the horn 78 extends generally upwardly and forwardly with respect to the stabilizing tab 56, this arrangement of the two horns permitting the same to be joined by a rod 80 which extends through an opening 82 in the elevator 52, the rod being pivotally connected at its opposite ends to the horns 76 and 78. From FIGS. 4 and 5 it will be obvious that the rod 80 will act to move the stabilizing tab relative to the elevator as the elevator is moved relative to the fixed stabilizer. It will also be obvious that the resultant movement of the stabilizing tab 56 is such that as the elevator is raised, or moved to a more nose-down position relative to the fixed stabilizer 58, corresponding to a decrease in the angle of attack, the stabilizing tab 56 will be moved to a less deflected position with respect to the elevator. FIG. 4, for example, illustrates the position of the stabilizing tab 56 when the elevator 52 is at its maximum angle of attack with respect to the fixed elevator 58, while FIG. 5 shows the position of the stabilizing tab when the elevator 52 is deflected upwardly to its minimum angle of attack relative to the stabilizer.

In this regard, it should be noted that the angle of attack of the elevator relative to the stabilizer 58 is not in general the same as its angle of attack with respect to the relative airspeed or wind since the stabilizer 58 will seldom, if ever, be aligned with the relative wind. However, it should be obvious that a change in the elevator angle of attack relative to the stabilizer 58, or other fixed parts of the helicopter, is equivalent to a corresponding change in the elevator angle of attack with respect to the relative wind. In considering the angle of attack of any part relative to the relative wind or other reference line, the part in question is considered to have a positive angle of attack if the part is inclined generally upwardly and forwardly with respect to the reference line, and to have a negative angle of attack if inclined generally downwardly and forwardly with respect to the reference line. Furthermore, a change in the angle of attack from a positive to a negative value or from a negative value to a more negative value will be considered a decrease in the angle of attack.

The movement of the stabilizing tab 56 is such that it can be said in effect to lead the movement of the elevator 52. That is, as the elevator 52 moves upwardly, or counterclockwise as viewed in FIGS. 4 and 5, the stabilizing tab 56 also moves upwardly but at a greater rate due to the relative movement between the tab and the elevator. Likewise, when the elevator 52 is moved downwardly the stabilizing tab also moves downwardly but at a greater rate.

Figure 6:
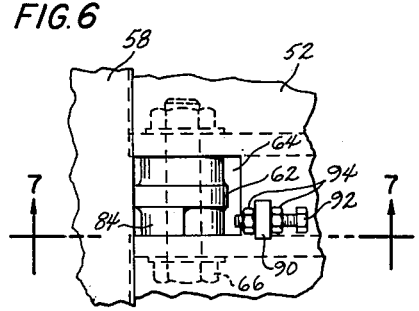
FIG. 6 is a fragmentary plan view showing one of the hinge connections between the fixed stabilizer and the elevator.
Figure 7:
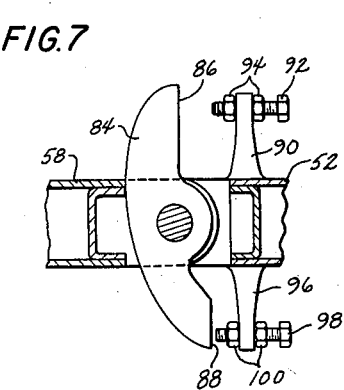
FIG. 7 is a sectional view taken on the line 7—7 of FIG. 6.

As mentioned above, FIGS. 4 and 5 show in general the limits of movement of the elevator 52, FIG. 4 showing the elevator in its maximum lowered or nose-up position corresponding to a maximum angle of attack and FIG. 5 showing the elevator in its maximum raised or nose-down position corresponding to a minimum angle of attack. These limits of elevator movement are established by suitable coengaging stop means associated with the elevator 52 and the fixed stabilizer 58. FIGS. 6 and 7, for example, show a suitable stop means which is associated with one of the elevator ears 62, 62. While these figures show only one of the ears 62, 62, it is to be understood that the other ear 62 preferably has a similar stop structure associated therewith. Referring to FIGS. 6 and 7, the illustrated ear 62 has fixed thereto, as by welding, a stop member 84 which extends both above and below the fixed stabilizer 58 to provide an upper abutment surface 86 and a lower abutment surface 88. Fixed to the upper surface of the elevator 52 is an arm 90 through the upper end of which passes a screw 92 held in place on the arm by two nuts 94, 94 threadably received by the screw and located on opposite sides of the arm 90. The free or left-hand end of the screw 92, as viewed in FIG. 7, is arranged to engage the upper abutment surface 86 to limit the upward or counterclockwise movement of the elevator 52. The screw 92 may, of course, be adjustably positioned relative to the arm 90 by properly loosening and tightening the nuts 94 to vary the maximum upward position of the elevator. Fixed to the lower surface of the elevator 52 is an arm 96 having associated therewith a screw 98 and nuts 100, 100, as shown. The free or left-hand end of the screw 98 cooperates with the abutment surface 88 to limit the downward or clockwise movement of the elevator 52, the screw 98 being adjustable relative to the arm 96 to vary the maximum downward position of the elevator.

Spring Biased Tabs and Associated Structure

Figure 8:
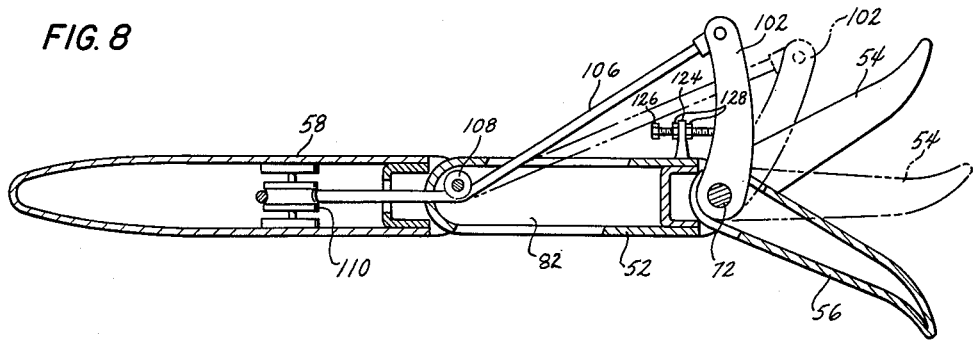
FIG. 8 is a sectional view of the stabilizer and elevator similar to FIGS. 4 and 5 but taken at a different transverse location on the stabilizer and elevator so as to show the mechanism associated with the spring biased elevator tabs.

Reference is now made to FIGS. 8 and 9 for a detailed description of the tabs 54, 54 and of the means for biasing the same.

As mentioned above, the two tabs 54, 54 are fixed to the opposite end portions of the shaft 72 so as to be moved in unison in response to rotation of the shaft. The shaft 72 is in turn loosely connected with the trailing edge of the elevator 52 by means of the apertured ears 74, 74 so that the tabs 54, 54 are free to move to various deflected positions relative to the elevator. Associated with the tabs 54, 54 is a means for biasing the same toward a maximum deflected position relative to the elevator in opposition to the aerodynamic pressure or moment exerted thereon by the relative wind. This means may take various different forms and may employ different types of biasing elements. In the illustrated and preferred embodiment, for example, the biasing means includes a spring for producing the biasing force, but even though the tabs 54, 54 are referred to herein for convenience as spring biased tabs, it is contemplated that other types of bias, such as a gravity bias employing a counterbalancing mass, might be employed in practicing some of the broader aspects of the invention.

In the illustrated embodiment the biasing means for the tabs 54, 54 includes an arm 102 fixed to the shaft 72, which arm, as shown best in FIG. 9, extends upwardly through a notch 104 formed in the stabilizing tab 56. Connected with the arm 102 is a cable 106 extends from the arm through the opening 82 in the elevator and through other parts of the helicopter to a means for imparting a bias force to the cable. The cable in turn transmits the bias force to the arm 102. The means for exerting the bias force on the cable may be located at any convenient place in the helicopter fuselage, the cable 106 being trained about suitable pulleys, such as those shown at 108, 110 and 112, in its path from the arm 102 to the biasing means. The pulley 108, mounted within the elevator 52, is preferably located at or near the hinge axis 60 of the elevator so that movement of the elevator relative to the fixed stabilizer 58 will cause a negligible movement of the spring tabs 54, 54 as a result of a lengthening or shortening effect on the cable 106.

Although the particular means for exerting the bias force on the cable 106 may take various forms, it preferably, and as shown, consists of a bungee 114 comprising a cylinder 116 having a helical compression spring 118 located in the bore thereof. As viewed in FIG. 9, the spring 118 has one end thereof in engagement with the right-hand end wall 120 of the cylinder and its other end in engagement with a piston 122 adapted for sliding movement longitudinally of the cylinder bore. The piston 122 is in turn connected to the free end of the cable 106 which extends through an opening in the cylinder end wall 120 and longitudinally through the center of the spring 118. Assuming the cylinder 116 to be fixed in the position shown by the solid lines of FIG. 9, the spring 118 is compressed between the cylinder end wall 120 and the piston 122 so as to exert a tension force on the cable 106. This force is transmitted to the arm 102 and produces a moment about the axis of the shaft 72 tending to move the spring tabs 54, 54 toward a maximum upwardly deflected position relative to the elevator 52. The maximum upward deflection of the spring tabs 54, 54 is controlled by a suitable stop means which may, as shown in FIG. 8, include an arm 124 fixed to the upper surface of the elevator 52, a screw 126 carried by the arm, and two nuts 128, 128 for adjustably positioning the screw relative to the arm 124 to vary the maximum tab deflection. As shown, the free or right-hand end of the screw 126 is adapted to engage the forward edge of the arm 102 to limit its upward or counterclockwise movement.

The spring biasing force imposed on the arm 102 by the cable 106 creates a moment about the axis of the shaft 72 which holds the arm 102 in engagement with the stop screw 126 until the aerodynamic pressure imposed on the spring tabs 54, 54 produces a greater and opposite moment on the shaft 72. In FIG. 8 the solid line showing of the one spring tab 54 and the associated arm 102 represents the relative positions of these parts when the tab is in its maximum upwardly deflected position relative to the elevator 52, the arm 102 in this case being held against further counterclockwise movement by the screw 126. The other tab 54, not shown in FIG. 8, is angularly aligned on the shaft 72 with the illustrated tab 54 and is accordingly similarly deflected with respect to the elevator. The broken line representation of the tab 54 and arm 102, on the other hand, shows the relative positions of these parts with the spring tab in its minimum deflected position. In this latter position the tab 54 is generally aligned with the elevator 52, the tab being moved to this position or various other positions between the broken and solid line positions of FIG. 8 by means of the aerodynamic pressure acting there-against and working in opposition to the bias force exerted by the cable 106.

At this point it should be noted that the geometry of the biasing means associated with the tabs 54, 54 is such that by proper selection and design of the spring 118 and the arm 102 the spring moment exerted about the axis of the shaft 72 may be made constant or substantially constant for all positions of the spring tabs 54, 54. Referring to FIGS. 8 and 9, it will be observed that movement of the spring tabs 54, 54 from a more to a less deflected position relative to the elevator 52 will cause compression of the spring 118 thereby increasing the spring force exerted on the cable 106 and the arm 102. While this increase in the spring force would normally be expected to produce an increase in the spring moment about the shaft 72, it will be further noted that the effective moment arm of the arm 102 is decreased as a result of the movement of the spring tabs. Thus, as the spring force is increased or decreased by movement of the spring tabs 54, 54 its effective moment arm with respect to the axis of the shaft 72 is respectively decreased or increased. Therefore, by proper design the effect of the change in spring force may be substantially eliminated by the change in moment arm, with the result that the total moment about the axis of the shaft 72 remains substantially constant. A constant spring moment about the axis of the shaft 72 is not necessarily essential to the operation of the stabilizer; however, it is preferred and will be assumed in the description which follows.

The spring moment exerted about the axis of the shaft 72 determines the relative airspeed at which the spring tabs will move away from their maximum deflected position and thereby determines the location of the sensitive range of the elevator with respect to the full spectrum or range of relative airspeeds encountered during forward flight. For example, assume that the biasing means is designed to exert a given and substantially constant biasing moment about the axis of the shaft 72. The spring tabs 54, 54 will then be held in their maximum upwardly deflected position until the relative airspeed increases to such a point that the aerodynamic pressure exerted thereon is sufficient to produce an aerodynamic moment equal and opposite to the biasing moment. A slight further increase in the relative airspeed thereafter causes the aerodynamic moment to exceed the spring moment and results in movement of the spring tabs toward a less deflected position, or counterclockwise as viewed in FIG. 8. This movement of the tabs changes their relationship with the moving air in such a manner that as the movement takes place the aerodynamic pressure on the tabs is reduced. Eventually, therefore, the tabs will reach a steady state position at which the aerodynamic moment once again balances the spring moment. Coupled with this movement of the spring tabs relative to the elevator is a movement of the elevator about its hinge axis brought about by an unbalanced moment condition about said axis resulting from the tab movement. This elevator movement will be counterclockwise, as viewed in FIG. 1, causing the spring tabs to be moved relative to the air in such a manner as to increase the aerodynamic pressure on the tabs. Thus, for a given increase in airspeed, the resulting movement of the tabs relative to the elevator will be greater than it would be if the elevator were stationary, but nevertheless, the final position of the tabs will represent a balance between the aerodynamic moment and the spring moment about the tab hinge axis.

Still further increases in the airspeed will further deflect the spring tabs 54, 54 and cause further counterclockwise movement of the elevator to smaller angles of attack. If the airspeed is continued to be increased, it eventually reaches a value at which the tabs will be blown down to a substantially streamline position and the elevator 52 moved to a maximum nosedown position at which the stop screw 92, FIG. 7, engages the surface 86. Between the airspeed at which the tabs first move from their maximum deflected position and the higher airspeed at which the elevator reaches its maximum nosedown position, the elevator is sensitive to changes in the airspeed. The range of airspeeds between these two limits is that which is referred to herein as the sensitive range of the elevator.

Assume now that the spring force exerted on the arm 102 is increased so as to increase the bias moment about the axis of the shaft 72. The spring tabs 54, 54 will now not move to a less deflected position until the relative airspeed reaches a value substantially greater than that required to produce tab movement in the former case. Likewise, a still greater relative airspeed will be required to move the elevator to its maximum nose-down position. The basic effect of an increase in bias force is therefore to shift the sensitive range of the elevator in the direction of higher relative airspeeds. Thus, by changing the bias force the sensitive range of the elevator may be shifted to suit the forward speed of the helicopter.

Preferably, the biasing means associated with the tabs 54, 54 includes means whereby the sensitivity range of the stabilizer 46 may be adjusted toward higher or lower relative airspeeds. As discussed above, the location of the sensitivity range depends on the spring moment on the tabs 54, 54 by the biasing means. The spring moment in turn may be varied by varying the spring force, as by changing the preload on the bungee spring 118. For example, in the solid line position of the bungee cylinder 116 of FIG. 9 the spring 118 is shown to be only slightly compressed between the piston 112 and the end wall 120 and therefore exerts only a relatively small spring force on the cable 106, making the stabilizer sensitive at relatively low airspeeds. Assume now, however, that the bungee cylinder 116 is moved to the left from the solid line position toward the broken line position. This increases the compression or preload of the spring 118 and accordingly increases the spring force exerted on the cable 106. Accordingly, the spring moment on the tabs 54, 54 is increased and the elevator made sensitive at relatively higher airspeeds.

As suggested above, this ability to change the sensitivity range of the stabilizer 46 is particularly advantageous in the case of a helicopter during forward flight since the sensitive range may therefore be shifted in accordance with the speed of the helicopter to maintain elevator sensitivity at the different speeds of forward flight. Although adjustment of the spring preload to control the sensitive range may be performed by suitable separate pilot operable mechanism, it desirably, and as shown, is automatically made in response to movement of the helicopter control device which is operable to increase or decrease the forward speed of the helicopter. For example, in FIG. 9 the bungee cylinder 116 is shown to be connected to the collective stick 40 by means of a cable 130. One end of the cable 130 is connected to a depending arm 132 of the collective stick, while the other end is fixed to the cylinder 116. As shown in FIG. 2, the collective stick 40 includes another depending arm 134 which is connected by means of a cable 136, or other suitable means, to the collective pitch changing means (not shown) associated with the rotor blades 28, 28. The control stick is supported for pivotal movement relative to the fuselage about an axis 138 so that movement of the stick from a lowered to a raised position will cause movement of the arm 134 to increase the collective pitches of the rotor blades 28, 28 and will simultaneously move the arm 132 in such a direction as to move the bungee cylinder 116 to increase the compression or preload on the spring 118. The sensitive range of the stabilizer 46 is therefore shifted toward higher relative airspeeds as the collective pitch of the blades is increased, and is shifted toward lower relative airspeeds as the collective pitch is decreased. In normal forward flight of the helicopter changes in the forward speed are obtained by changing the collective stick setting with the stick being raised for greater forward speed and lowered for less forward speed. Therefore, the stabilizer sensitive range is shifted in the same direction as the speed of the helicopter and by proper design may be made, at least for the relatively higher speeds at which stability with respect to speed changes is quite important, to always embrace the speed at which the helicopter is flying.

*Operation of Velocity Sensitive Stabilizer*

Having now described the structure of the velocity sensitive stabilizer of this invention, its operation will be described below both in regard to autorotative flight and level forward flight in which regimes the stabilizer is of particular benefit to the helicopter.

Figure 10:
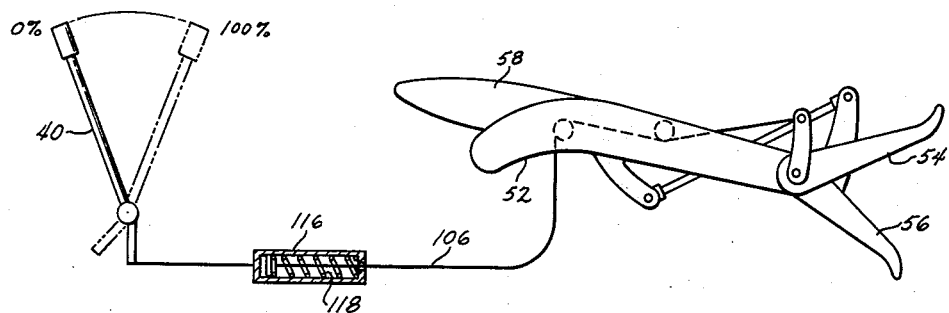
Figure 11:
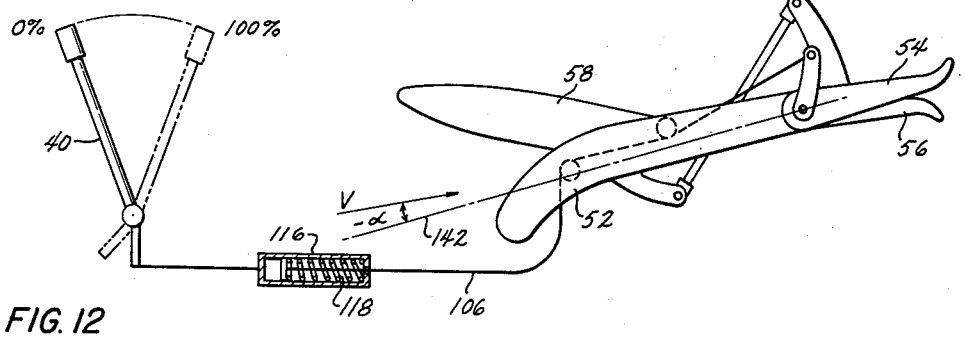

The action of the stabilizer during autorotative flight will be considered first, and for this purpose reference is made to FIGS. 10, 11 and 15. FIG. 15 illustrates the trim attitude of the helicopter for autorotative descent. The helicopter travels generally forwardly and downwardly so that the relative wind V is directed generally upwardly and rearwardly, as shown by the arrow, and preferably is trimmed to a generally nose-up attitude so as to provde a substantial angle of attack between the relative wind V and the plane of the rotor blade tip path, indicated generally by the line 140. Considering an upwardly acting tail lift to be positive and a downwardly acting tail lift to be negative, this trim attitude requires that the tail lift be substantially less positive than that required for forward flight. Whether the tail lift should actually act upwardly or downwardly depends on the sense of the sum of the moments contributed by other forces acting about the helicopter center of gravity (C.G.). In practically all cases, however, the other forces acting on the helicopter are such that the tail lift must act in a downward direction, as indicated by the arrow $L_t$ in FIG. 15, in order to balance the same at the desired nose-up trim attitude.

FIGS. 10 and 11 illustrate how the stabilizer operates to produce the required downward, or less positive, tail lift during autorotation. It will first be observed that during autorotation the collective stick 40 is held in its maximum forward position, referred to as the 0% collective stick position, to provide the rotor blades with a minimum collective pitch. The bungee cylinder 116 is thus accordingly held at a position representing minimum preload on the spring 118. It will also be noted that due to the nose-up attitude of the helicopter the fixed stabilizer 58 is positioned at a greater angle to the horizontal than it is for level forward flight. FIG. 10 shows the elevator 52 in an aligned or neutral position with respect to the fixed stabilizer 58, such position corresponding to maximum deflection of the spring tabs 54, 54 and the stabilizing tab 56. Actually, due to the movement of the wind relative to the stabilizer, the stabilizer parts will never assume the relative positions shown in FIG. 10 during autorotation, and the figure is presented to merely indicate that with the parts in the neutral position shown the spring 118 is almost fully extended (or only slightly preloaded) so as to exert a relatively small biasing moment on the spring tabs 54, 54. Accordingly, only a relatively small aerodynamic pressure is required to cause deflection of the spring tabs and repositioning of the elevator 52.

Because of the small spring bias on the tabs during autorotative descent, the usual relative wind velocity encountered is sufficiently large to blow the spring tabs to a generally streamline position with respect to the elevator 52, thereby causing the elevator to be moved to its maximum nose-down position at which the screw 92 of the stop means engages the abutment surface 86. FIG. 11 shows this condition of the elevator. If the tabs 54, 54 are deflected relative to the elevator, as viewed in FIG. 10, they react with the wind to produce a clockwise aerodynamic moment about the elevator hinge axis which is opposed by a counterclockwise aerodynamic moment contributed by the stabilizing tab 56. As the spring biased tabs 54, 54 are moved by the relative wind to the streamline or minimum deflected position shown in FIG. 11, they lose their moment producing effectiveness with the result that the counterclockwise moment of the stabilizing tab moves the elevator to its maximum nose-dow or counterclockwise position as determined by the stop means shown in FIGS. 6 and 7.

The spring bias moment on the tabs 54, 54 is such that the elevator will retain this maximum nose-down position relative to the fixed stabilizer throughout the entire autorotative flight regime. In other words, the sensitivity range of the elevator is located below the usual airspeeds encountered in autorotation with the result that the elevator is insensitive to changes in the airspeed and will stay in its maximum nose-down position. This maximum nose-down position of the elevator is such that the relative wind V has a negative angle of attack ($-\alpha$) with respect to the zero lift chord, indicated at 142, of the elevator so as to produce a downwardly acting tail lift $L_t$, as desired.

Contrary to the situation prevailing during power-on forward flight, the illustrated helicopter, during autorotative descent, has positive longitudinal static stability with respect to changes in airspeed so that no change in the elevator angle of attack is necessary to produce a stable situation. Assume, for example, that the relative wind is increased from the trim condition shown in FIG. 15. The increased airspeed in this case increases the downwardly acting tail lift $L_t$ so as to produce a nose-up pitching moment on the helicopter, thereby causing the rotor and fuselage to be tilted toward a more nose-up attitude. This tilting of the rotor in turn increases the angle of attack between the relative wind and the plane of the rotor blade tip path causing an increase in the lifting force of the rotor which counteracts the airspeed increase and returns the helicopter to a stable trim condition.

Figure 12:
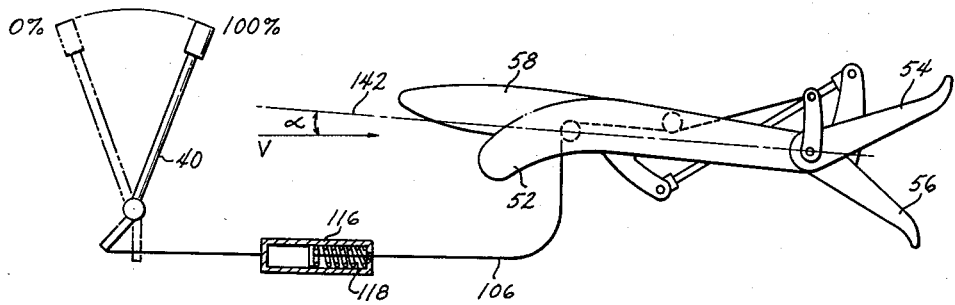
Figure 13:
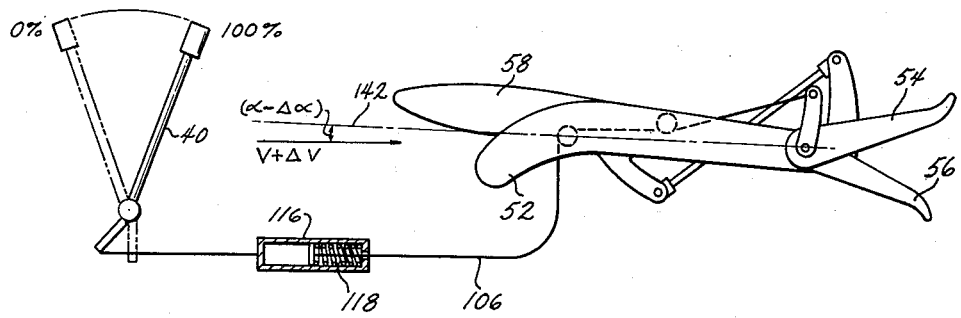

Turning now to the action of the stabilizer during level power-on forward flight, reference is made to FIGS. 12, 13 and 14. FIG. 14 illustrates a trim attitude of the helicopter for this regime of flight. The fuselage 20 has a substantially horizontal attitude, while the plane of the rotor tip path 140 is tilted somewhat forwardly so that the relative wind V, which is generally horizontal and opposite to the direction of helicopter movement, strikes the upper surface of the rotor tip path plane and passes generally downwardly through the rotors. To produce the illustrated attitude of the helicopter requires that the tail lift $L_t$ be substantially more positive than in the case of autorotative flight. This in turn, in the case of most helicopters, means that the tail lift should act upwardly, as shown in FIG. 14, so as to produce a nose-down pitching moment on the helicopter; although, depending on the distribution of forces about the helicopter center of gravity, it may in some cases be necessary that the tail lift act downwardly. If the helicopter design is such that a downwardly acting tail lift is required to produce a trim condition, the helicopter will be essentially stable with respect to changes in the airspeed, while on the other hand, if an upwardly acting tail lift is required, the helicopter will be essentially unstable with respect to changes in the airspeed. The stabilizer of this invention is therefore of greatest benefit in the latter and more common type of helicopter wherein it is effective to impart positive stability characteristics to a helicopter which is otherwise unstable. Nevertheless, the stabilizer may also be employed to advantage in helicopters requiring a downwardly acting tail lift and in such cases will act to improve the stability characteristics.

Consideration of FIG. 14 shows that without the velocity sensitive stabilizer of the present invention the illustrated helicopter, which for trim requires an upward tail lift, is inherently unstable with respect to changes in the relative wind. For example, assume that all of the stabilizer parts are fixed relative to the helicopter fuselage and are so designed as to provide the required amount of upward tail lift to achieve the trim attitude of FIG. 14 when the relative wind is of the magnitude V, as shown. If the wind is now increased, the increased airspeed increases the upward tail lift on the stabilizer to produce a nose-down pitching moment about the helicopter center of gravity (C.G.). The resultant movement of the helicopter to a nose-down position by this pitching moment tends to further increase the airspeed by tilting the rotor tip path plane further forwardly, thereby increasing the forward component of rotor thrust. A decrease in the airspeed has the opposite effect of changing the helicopter attitude to still further decrease the airspeed. Thus, the changes in tail lift produced by the changes in airspeed have a destabilizing effect. In prior helicopters this destabilizing effect was generally dealt with by manually adjusting the pitches of the rotor blades in a longitudinal cyclic manner to produce moments counteracting those produced by the changes in tail lift. This not only requires alertness on the part of the pilot, but also increases pilot fatigue and increases the vibration level of the helicopter when the latter is flown at a speed other than the trim speed.

As applied to the illustrated helicopter, the velocity sensitive stabilizer of this invention operates to eliminate the increase in upward tail lift normally accompanying airspeed changes and to thereby impart longitudinal stability to the helicopter during forward flight. This is accomplished by changing the angle of attack, and thereby the lift coefficient, of the elevator 22 in response to the airspeed and in such a manner that as the airspeed increases the elevator angle of attack decreases. In this regard the movement of the elevator from a positive angle of attack to a negative angle of attack, or from one negative angle of attack to a more negative angle of attack, is considered to be a decrease in the angle of attack.

FIGS. 12 and 13 show the relative positions of the stabilizer parts at two different relative winds and with the collective stick 40 moved to its maximum raised or rearward position, referred to as the 100% collective stick position, corresponding generally to maximum forward speed. With this position of the collective stick 40 the bungee cylinder 116 is held in such a position that the spring 118 is compressed or preloaded to a relatively high extent which causes a relatively high spring bias to be exerted on the spring tabs 54, 54. The sensitivity range of the elevator is therefore in the area of higher airspeeds corresponding to the high forward speed of the helicopter resulting from the 100% collective stick position.

In FIG. 12 the stabilizer parts are shown as positioned in the case of a relative wind V which is close to the lower limit of the elevator sensitive range so that the elevator is held with only a slight force in its maximum nose-up position or is slightly moved from such position. Under these conditions the wind V has a positive angle at attack ($\alpha$) with respect to the zero lift chord 142 of the elevator so as to produce an upwardly directed tail lift on the elevator.

Assume now, however, that because of a gust or other disturbance the relative wind is suddenly increased from V to $V+\Delta V$, as shown in FIG. 13. The increased relative wind causes the spring tabs 54, 54 to be blown down to a less deflected position relative to the elevator 52, and consequently causes movement of the elevator and stabilizing tab 56 until the elevator is once again balanced about its hinge axis at a new position relative to the fixed stabilizer 58. The new positions of the elevator and the spring and stabilizer tabs are shown in FIG. 13. It will be observed that the elevator has been moved counterclockwise from the FIG. 12 position so that its zero lift chord 142 is now at a smaller angle of attack ($\alpha-\Delta\alpha$) than previously. Obviously, the decreased angle of attack corresponds to a decreased lift coefficient, and by properly designing the various parts of the stabilizer the change in lift coefficient may be made such as to completely offset the change in tail lift normally accompanying the airspeed change so as to maintain a substantially constant tail lift, or even may be made to more than offset the change in tail lift so that an increase in airspeed actually results in a decrease in the upward tail lift and a decrease in airspeed results in an increase in upward tail lift. In either of these cases the effect of the elevator position changes will be stabilizing on the helicopter.

Also, it should be noted that an increase in the airspeed sufficient to move the elevator to a negative angle of attack so that the tail lift is reversed from an upwardly acting force to a downwardly acting force does not change the stabilizing characteristics of the elevator. The important consideration for stabilization is that the upward tail lift remain constant or be decreased for an increase in airspeed and, as mentioned above, a change from an upward tail lift to a downward tail lift is the same as a decrease in the upward tail lift.

The invention claimed is:

1. In an aircraft, the combination of a fuselage, an elevator supported for free floating movement about a transverse hinge axis fixed relative to said fuselage, first means connected with said elevator providing an aerodynamic reaction surface which reaction surface deflects as a function of airspeed with respect to the elevator to produce changes in the aerodynamic moment about the elevator hinge axis and to thereby cause movement of said elevator to different positions relative to said fuselage, and second means connected with said elevator and operable in response to movement of said elevator relative to said fuselage to produce a change in moment on said elevator acting to counteract the elevator movement produced by deflection of said reaction surface thereby restoring balance to the elevator at a new position representing a change in elevator position which change is substantially smaller than the change which would have been produced by the deflection of the reaction surface acting alone.

2. In an aircraft, the combination of a fuselage, an elevator supported for free floating movement about a transverse hinge axis fixed relative to said fuselage, means providing a first reaction surface movable with said elevator and arranged to exert an aerodynamic moment on said elevator acting about said hinge axis and which reaction surface has a deflection relative to said elevator which deflection varies with the relative velocity of the air passing thereover, means providing a second reaction surface movable with said elevator and arranged to exert another aerodynamic moment on said elevator acting about said hinge axis, and means responsive to the movement of said elevator about said hinge axis and relative to said fuselage for moving said second reaction surface relative to said elevator and in such a direction as to produce a change in its aerodynamic moment about said elevator hinge axis which change opposes the movement of said elevator with the result that elevator movement caused by deflection of said first reaction surface is stabilized by said second reaction surface.

3. In an aircraft, the combination of a fuselage, an elevator supported for free floating movement about a transverse hinge axis fixed relative to said fuselage, first and second tab means carried by said elevator and movable between various deflected positions relative to said elevator, means for biasing said first tab means toward a maximum deflected position in opposition to the aerodynamic moment imposed thereon with the result that the said tab means will be moved to a less deflected position when the aerodynamic moment imposed thereon overcomes the opposing moment exerted by said biasing means, and means responsive to the movement of said elevator relative to said fuselage for moving said second tab means relative to said elevator and in such a direction as to produce a change in aerodynamic moment about the elevator hinge axis opposing the movement of said elevator with the result that said second tab means serves to stabilize the elevator movement caused by changes in the deflection of said first tab means.

4. In an aircraft, the combination of a fuselage, an elevator supported for free floating movement about a transverse elevator hinge axis fixed relative to said fuselage so as to be capable of assuming various different aerodynamically balanced angular positions relative to said fuselage, first tab means connected with said elevator for movement relative thereto about a transverse axis located generally aft of said elevator hinge axis, means biasing said first tab means toward a maximum upwardly deflected position relative to said elevator in opposition to the aerodynamic moment imposed thereon and for permitting its movement to a less deflected position when the aerodynamic moment exceeds the moment exerted by said biasing means, second tab means connected with said elevator for movement relative thereto about a transverse axis located generally aft of said elevator hinge axis, said second tab means being normally deflected downwardly relative to said elevator, and means responsive to the movement of said elevator relative to said fuselage for moving said second tab means relative to said elevator and in the same sense as the elevator to produce a change in its aerodynamic moment about the elevator hinge axis which moment change opposes the movement of said elevator with the result that elevator movement brought about by a change in the deflection of said first tab means is stabilized by said second tab means.

5. In an aircraft, the combination of a fuselage, a stabilizer fixed relative to said fuselage and extending transversely thereof, an elevator pivotally connected to the trailing edge of said stabilizer for free floating movement about a transverse hinge axis so as to be capable of assuming various different aerodynamically balanced angular positions relative to said stabilizer, first tab means connected with the trailing edge of said elevator for movement relative thereto between various deflected positions, means biasing said first tab means toward a maximum deflected position relative to said elevator in opposition to the aerodynamic moment imposed thereon and for permitting its movement to a less deflected position when the aerodynamic moment exceeds the moment exerted by said biasing means, second tab means connected with the trailing edge of said elevator for movement relative thereto between various deflected positions, and means responsive to the movement of said elevator relative to said stabilizer for moving said second tab means relative to said elevator and in such a direction as to produce a change in its aerodynamic moment about the elevator hinge axis which moment change opposes the movement of said elevator with the result that elevator movement brought about by a change in the deflection of said first tab means is stabilized by said second tab means.

6. In an aircraft, the combination of a fuselage, an elevator supported for free floating movement about a transverse hinge axis fixed relative to said fuselage so as to be capable of assuming various aerodynamically balanced positions relative to said fuselage, a plurality of tabs located along the trailing edge of said elevator in end to end fashion and dividing said elevator into a corresponding number of transverse portions associated respectively with said tabs, means supporting said tabs for movement about a transverse axis fixed relative to said elevator between various deflected positions relative to said elevator, means biasing at least one of said tabs toward a maximum deflected position relative to said elevator in opposition to the aerodynamic moment imposed thereon and for permitting movement of said at least one tab to a less deflected position when the aerodynamic moment exceeds the moment exerted by said biasing means, and means responsive to the movement of said elevator relative to said fuselage for moving the remainder of said tabs relative to said elevator and in such a direction as to produce a change in aerodynamic moment about the elevator hinge axis opposing the movement of said elevator so as to stabilize the elevator movement brought about by changes in the deflection of said at least one tab.

7. In an aircraft, the combination of a fuselage, a stabilizer fixed relative to said fuselage and extending transversely thereof, an elevator pivotally connected to the trailing edge of said stabilizer for free floating movement about a transverse hinge axis, said elevator having a middle portion coextensive with said elevator which middle portion extends generally rearwardly from said hinge axis and also having two opposite end portions located outboard of said stabilizer and extending both rearwardly and forwardly of said hinge axis, first tab means connected with said elevator for movement relative thereto between various deflected positions, means biasing said first tab means toward a maximum deflected position relative to said elevator in opposition to the aerodynamic moment imposed thereon and for permitting its movement to a less deflected position when the aerodynamic moment exceeds the moment exerted by said biasing means, second tab means connected with said elevator for movement relative thereto between various deflected positions, and means responsive to the movement of said elevator relative to said stabilizer for moving said second tab means relative to said elevator and in such a direction as to produce a change in its aerodynamic moment about the elevator hinge axis which moment change opposes the movement of said elevator with the result that elevator movement brought about by a change in the deflection of said first tab means is stabilized by said second tab means.

8. In an aircraft, the combination of a fuselage, a stabilizer fixed relative to said fuselage and extending transversely thereof, an elevator pivotally connected to the trailing edge of said stabilizer for free floating movement about a transverse hinge axis, said elevator having a middle portion coextensive with said stabilizer which middle portion extends generally rearwardly from said hinge axis and also having two opposite end portions located outboard of said stabilizer and extending both rearwardly and forwardly of said hinge axis, three tabs pivotally connected with the trailing edge of said elevator in end to end fashion for movement about a transverse axis between various deflected positions relative to said elevator, the middle one of said tabs being generally coextensive with said middle elevator portion and the two end tabs being generally coextensive respectively with said two outboard elevator portions, means fixing the relative angular relationship between said two end tabs whereby said two tabs move in unison, means biasing said two tabs toward a maximum upwardly deflected position relative to said elevator in opposition to the aerodynamic moment imposed thereon and for permitting movement of said two tabs to a less deflected position when the aerodynamic moment exceeds the moment exerted by said biasing means, said middle tab being normally deflected downwardly relative to said elevator so as to counteract the aerodynamic moment imposed on said elevator by said two end tabs and thereby balance said elevator at a related angle of attack, and means responsive to the movement of said elevator relative to said stabilizer for moving said middle tab relative to said elevator and in such a direction as to produce a change in its aerodynamic moment on the elevator which change opposes the elevator movement brought about by a change in the deflection of said two end tabs so as to rebalance said elevator at a new angle of attack after a change in the relative wind sufficient to cause a change in the deflection of said two end tabs.

9. In an aircraft, the combination of a fuselage, an elevator supported for free floating movement about a transverse hinge axis fixed relative to said fuselage, a plurality of tabs located along the trailing edge of said elevator and operable to aerodynamically balance said elevator at various different angles of attack corresponding to different velocities of the relative wind, said plurality of tabs including at least one tab spring biased toward a maximum upwardly deflected position relative to said elevator and adapted to be blown down to a less deflected position when the aerodynamic moment imposed thereon exceeds the spring moment, the downward movement of said at least one tab to a less deflected position causing said elevator to be moved to a more nose down position to decrease its angle of attack, and means responsive to the movement of said elevator relative to said fuselage for moving the remainder of said tabs relative to said elevator and in such a direction as to produce a change in aerodynamic moment about the elevator hinge axis opposing the movement of said elevator so as to stabilize the elevator movement brought about by changes in the deflection of said at least one tab.

10. In an aircraft, the combination of a fuselage, an elevator supported for free floating movement about a transverse hinge axis fixed relative to said fuselage, means connected with said elevator defining an aerodynamic reaction surface which surface is movable to various different deflected positions relative to said elevator to control the elevator angle of attack by changing the aerodynamic moment about said hinge axis, said reaction surface being so arranged that maximum deflection thereof relative to said elevator results in a maximum elevator angle of attack while smaller deflections result in correspondingly smaller elevator angles of attack, mechanism connected with said latter means including a spring operable to urge said reaction surface toward its maximum deflected position in opposition to the aerodynamic moment imposed thereon by the relatively moving air whereby said reaction surface is held in said maximum deflected position for relative air velocities below that required to overcome the spring moment and for higher air velocities is moved to less deflected positions representing a balance between the spring and aerodynamic moments exerted thereon and producing smaller elevator angles of attack, and means for adjustably preloading said spring to vary the spring moment imposed on said reaction surface so as to thereby vary the magnitude of the air velocity required to move said reaction surface from its maximum deflected position and said elevator from its maximum angle of attack.

11. The combination as defined in claim 10 further characterized by means connected with said elevator defining a second reaction surface which second surface is movable to various deflected positions relative to said stabilizer to additionally control the elevator angle of attack by changing the aerodynamic moment about said hinge axis, and means responsive to movement of said elevator about said hinge axis and relative to said fuselage for moving said second reaction surface relative to said elevator and in such a direction as to produce a change in its aerodynamic moment about said hinge axis which change opposes the movement of the elevator with the result that elevator movement caused by deflection of said first-mentioned reaction surface is stabilized by said second reaction surface.

12. In a helicopter, the combination of a fuselage, rotor means carried by said fuselage and including a plurality of adjustable pitch blades, a pilot operable device for collectively changing the pitches of said rotor blades in response to movement of said device in various predetermined directions, stabilizer means connected with said fuselage for controlling the longitudinal trim of said helicopter, said stabilizer means including a velocity sensitive elevator having an angle of attack which varies as a function of the relative airspeed over a given sensitive range of relative airspeeds and in such a manner that the angle of attack decreases with an increase in the relative airspeed, means operable to adjust the sensitive range of said elevator toward higher or lower relative airspeeds, and means connected with said pilot operable device for operating said sensitive range adjustment means in response to movement of said pilot operable device and in such a manner that the sensitive range is moved toward higher relative airspeeds as the said pilot operable device is moved to increase the collective pitch of said rotor blades and is moved toward lower relative airspeeds as said pilot operable device is moved to decrease the collective pitch of said rotor blades.

13. In a helicopter, the combination of a fuselage, rotor means carried by said fuselage and including a plurality of adjustable pitch blades, a pilot operable device for collectively changing the pitches of said rotor blades in response to movement of said device in various predetermined directions, stabilizer means connected with said fuselage for controlling the longitudinal trim of said helicopter, said stabilizer means including an elevator supported for free floating movement relative to said fuselage about a transverse hinge axis so as to have a variable angle of attack, and means including a spring biased tab on said elevator for aerodynamically positioning said elevator about said hinge axis to different angles of attack in accordance with the relative wind velocity, said tab being so arranged that an increase in the relative wind velocity sufficient to move the same in opposition to its spring bias results in movement of said elevator to a smaller angle of attack, and means connected with said pilot operable device for adjusting the spring bias of said tab in response to movement of said device and in such a manner that the spring bias is increased as the said pilot operable device is moved to increase the collective pitch of said rotor blades and decreased as said pilot operable device is moved to decrease the collective pitch of said rotor blades.

14. In a helicopter, the combination of a fuselage, rotor means carried by said fuselage and including a plurality of adjustable pitch blades, a pilot operable device for collectively changing the pitches of said rotor blades in response to movement of said device in various predetermined directions, an elevator supported for free floating movement relative to said fuselage about a transverse hinge axis, first and second tab means carried by said elevator and movable between various deflected positions relative to said elevator to aerodynamically move said elevator to different positions about said hinge axis corresponding to different angles of attack, means including a spring for biasing said first tab means toward a maximum deflected position in opposition to the aerodynamic moment imposed thereon, said first tab means being arranged so that movement of said first tab means to a less deflected position results in movement of said elevator to a smaller angle of attack, means responsive to the movement of said elevator relative to said fuselage for moving said second tab means relative to said elevator and in such a direction as to produce a change in moment about the elevator hinge axis opposing the movement of said elevator, and means connected with said pilot operable device for adjusting the preload on said spring so as to vary the magnitude of the spring moment exerted on said first tab means in response to movement of said pilot operable device, said latter means being operable to increase the preload on said spring as the said pilot operable mechanism is moved to increase the collective pitch of said rotor blades and to decrease the preload as said pilot operable device is moved to decrease the collective pitch of said rotor blades.

15. In a helicopter, the combination of a fuselage, rotor means carried by said fuselage including a plurality of adjustable pitch blades, a pilot operable device for collectively changing the pitches of said rotor blades in response to movement of said pilot operable device in various predetermined directions, an elevator supported for free floating movement about a transverse hinge axis fixed relative to said fuselage, means connected with said elevator defining an aerodynamic reaction surface which surface is movable to various different deflected positions relative to said elevator to control the elevator angle of attack by changing the aerodynamic moment about said hinge axis, said reaction surface being so arranged that maximum deflection thereof relative to said elevator results in a maximum elevator angle of attack while smaller deflections result in correspondingly smaller elevator angles of attack, mechanism connected with said latter means including a spring operable to urge said reaction surface toward its maximum deflected position in opposition to the aerodynamic moment imposed thereon by the relatively moving air whereby said reaction surface is held in said maximum deflected position for relative air velocities below that required to overcome the spring moment and for higher air velocities is moved to less deflected positions representing a balance between the spring and aerodynamic moments imposed thereon and producing smaller elevator angles of attack, and means connected with said pilot operable device for adjusting the preload on said spring in response to movement of said pilot operable device in said various predetermined directions so as to thereby vary the magnitude of the air velocity required to move said reaction surface from its maximum deflected position and said elevator from its maximum angle of attack, said latter means being operable to increase the preload on said spring as said pilot operable device is moved to increase the collective pitch of said rotor blades and to decrease the preload on said spring as said pilot operable device is moved to decrease the collective pitch of said rotor blades.

16. In a helicopter, the combination of a fuselage, rotor means carried by said fuselage including a plurality of adjustable pitch blades, a pilot operable device for collectively changing the pitches of said rotor blades in response to movement of said pilot operable device in various predetermined directions, an elevator supported for free floating movement about a transverse hinge axis fixed relative to said fuselage, a plurality of tabs supported on said elevator for movement about a transverse axis between various deflected positions relative to said elevator, said tabs being operable to aerodynamically move said elevator to different positions about said hinge axis to change its angle of attack, means biasing at least one of said tabs toward a maximum deflected position relative to said elevator in opposition to the aerodynamic moment imposed thereon and for permitting movement of said at least one tab to a less deflected position when the aerodynamic moment thereon exceeds the moment exerted by said biasing means, said at least one tab being so arranged relative to said elevator that movement thereof to a less deflected position results in movement of said elevator to a smaller angle of attack and said biasing means, including a spring, means responsive to the movement of said elevator relative to said fuselage for moving the remainder of said tabs relative to said elevator and in such a direction as to produce a change in aerodynamic moment about the elevator hinge axis opposing the movement of said elevator so as to stabilize the elevator movement brought about by changes in the deflection of said at least one tab, and means connected with said pilot operable device for adjusting the preload on said spring in response to movement of said pilot operable device in said various predetermined directions so as to thereby vary the magnitude of the air velocity required to move said at least one tab from its maximum deflected position and said elevator from its maximum angle of attack, said latter means serving to increase the preload on said spring as said pilot operable device is moved to increase the collective pitch of said rotor blades and to decrease the preload on said spring as said pilot operable device is moved to decrease the collective pitch of said rotor blades.

References Cited in the file of this patent

UNITED STATES PATENTS

| | | |
|---|---|---|
| 1,030,826 | Mayer | June 25, 1912 |
| 1,786,545 | Noeggerath | Dec. 30, 1930 |
| 2,547,255 | Bruel | Apr. 3, 1951 |
| 2,630,709 | Hoffman | Mar. 10, 1953 |
| 2,950,074 | Apostolescu | Aug. 23, 1960 |

FOREIGN PATENTS

| | | |
|---|---|---|
| 793,426 | France | Jan. 24, 1936 |